Patented Aug. 27, 1935

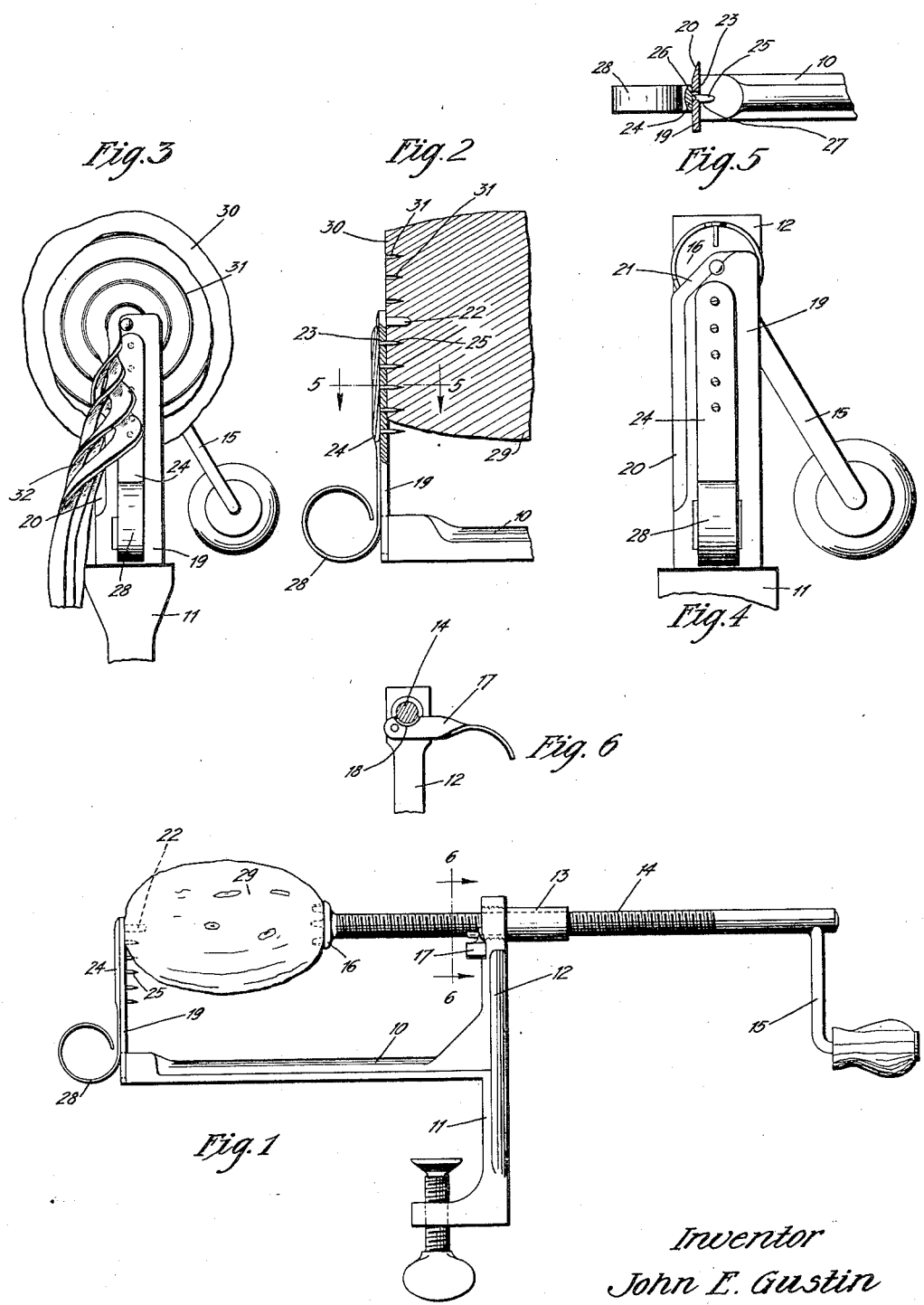

2,012,507

UNITED STATES PATENT OFFICE 2,012,507

CUTTER FOR LONGITUDINAL AND RADIAL VEGETABLE SLICING

John E. Gustin, Fort Dodge, Iowa

Application May 11, 1933, Serial No. 670,482

2 Claims. (Cl. 146—166)

The object of my invention is to provide an improved mechanism for slicing vegetables such as potatoes and similar articles into long, narrow and thin ribbons, so that the vegetables may be rapidly cooked in hot grease or frying compound.

More specifically it is the object of my invention to provide a vegetable slicer including a support and means for rotatively mounting therein the vegetable to be sliced, and in connection therewith means for slicing comparatively thin and narrow ribbons from one end of the article as it is rotated, into continuous long, narrow, and thin slices or ribbons.

A further object is to provide in that type of vegetable slicer, employing a support and means for rotatively mounting the vegetable to be sliced and a slicing blade for removing one end of the vegetable in a continuous and thin helical slice of material, improved means detachably connected therewith whereby the end of the vegetable being sliced may be first provided with a series of concentric grooves, whereby the helical slice may be subdivided into a series of narrow slices or ribbons as the slicing operation takes place, thus providing means whereby a single slicing device may be utilized to either form a continuous helical slice from one end of the vegetable or a series of comparatively thin and narrow ribbons of the vegetable.

A further object is to provide in connection with a slicing blade having one edge sharpened and its body provided with a row of spaced openings, the blade supporting bar being designed to be supported adjacent to said row of openings, and in connection therewith a slicing blade projecting through each of said openings, improved means for detachably supporting the blade supporting bar and the slicing blades connected therewith to the first said blade.

A further object is to provide in a vegetable slicer improved means for feeding the vegetable to the slicing blade.

My invention consists in the construction, arrangement and combination of the various parts of the device, whereby the objects contemplated are attained, as hereinafter more fully set forth, pointed out in my claims, and illustrated in the accompanying drawing, in which:

Figure 1 illustrates a side elevation of my improved slicer showing the manner in which the vegetable is supported therein.

Figure 2 is an enlarged detail view of one end of the slicer showing the manner in which the slicing blade penetrates the article being sliced.

Figure 3 is an end view of Figure 2 showing the manner in which the ribbons are removed from the vegetable.

Figure 4 is an end elevation of the slicer.

Figure 5 is a detail sectional view taken on the line 5—5 of Figure 2.

Figure 6 is a detail sectional view taken on the line 6—6 of Figure 1.

Referring to the accompanying drawing, I have used the numeral 10 to indicate a supporting bar having a table clamp 11 at one end, of ordinary construction, and also provided with an upwardly extending support 12 terminating in a sleeve or bearing 13 for rotatively and slidably supporting a screw threaded shaft 14, said shaft having a crank 15 at one end and a vegetable engaging claw 16 at its opposite end.

A lever 17 is pivoted to the support 12 and is provided with a screw threaded portion 18 designed to engage the under surface of the shaft 14 when the free end of the lever 17 is at its upper limit of movement, whereby the shaft 14 will be positively advanced longitudinally inwardly as the shaft is rotated by the crank 15. After the free end of the lever 17 is moved to its lowered position, the threaded portion 18 will disengage the shaft 14 and permit the same to be slid longitudinally outwardly.

The opposite end of the support 10 is provided with an upwardly extending blade 19 having one edge provided with a sharpened portion 20 and a portion of its upper end provided with an inclined sharpened portion 21. The upper end of the blade 19 is also provided with an inwardly extending pivot member 22, supported in axial alinement with the shaft 14.

The blade 19 is also provided with a row of equally spaced openings 23 substantially in radial alinement with the pivot member 22.

Supported adjacent to the outer surface of the blade 19 is a cutter supporting bar 24 designed to cover the said row of openings, and provided with a cutter 25 projecting inwardly through each of said openings 23 and beyond the inner surface of the blade 19, in the manner clearly illustrated in Figure 2.

One edge of each of the cutters 25 is provided with a notch 26 to receive one edge of the openings 23 in the manner illustrated in Figure 5, so that shoulders 27 are provided on the blades 25 to lock the blades against outward movement as pressure is applied thereto.

The cutters are removed by moving the bar 24 laterally in a direction opposite from which the article being sliced is rotated, to free the shoulders 27 from the blade 19, after which the bar 24 is moved laterally from the blade 19.

The width of the openings 26 is slightly greater than the width of the cutter 25. The lower end of the bar 24 is provided with a loop portion 28 by means of which the bar 24 may be easily grasped and removed from the cutter blade by simply inserting one finger through the loop portion 28 and gripping the outer surface of the loop portion with the thumb.

The operation of my improved slicer is as follows:

The shaft 14 is first slid to its outer limit of movement, after which a vegetable, such as a potato 29, is grasped and moved to position with one end against the claw 16. Pressure is then applied to force the prongs of the claw into the vegetable. The crank 15 is then grasped and slid inwardly together with the vegetable until its opposite end engages the pivot member 22. Further pressure will cause the said pivot member to enter the vegetable, after which the vegetable may be rotated by rotating the crank 15.

The outer end of the lever 17 is then elevated, causing the threaded portion 18 to engage the threaded portion of the shaft 14, after which the said shaft is rotated, causing the vegetable to be rotated and the end adjacent to the pivot 22 caused to engage the edges 20 and 21 of the cutter blade 19, and also the cutters 25 will be forced into the end of the vegetable.

As the vegetable is rotated, the cutters 20 and 21 will slice the end of the vegetable and provide a flat face 30, illustrated in Figures 2 and 3, which will be formed with concentric grooves 31, by means of the cutters 25, of a greater depth than the pitch of the threads of the shaft 14, so that the depth of the said grooves will be greater than the thickness of the layers of vegetables removed by the cutters 20 and 21, so that comparatively thin and narrow ribbons of material 32 will be formed in a continuous manner until the entire vegetable has been sliced.

If the cutter bar 24 and cutters 25 are removed and the vegetable 29 rotated in the manner before described, comparatively thin helical slices of vegetable will be formed by the cutters 20 and 21 of a width equal to one-half the diameter of the vegetable being sliced. Thus the slicer may be employed to either slice the vegetable into a continuous ribbon of material, or into a continuous helical slice as desired by the operator.

I claim as my invention:

1. A vegetable slicer comprising a support having a laterally projecting cutter blade at one end and a bearing support at its other end parallel with said blade, a bearing member in said support, a screw threaded shaft rotatively and slidably mounted in said bearing member, means for engaging the screw threaded portion of said shaft and causing it to move longitudinally as it is rotated, a stock engaging claw on the inner end of said shaft, a pivot member projecting inwardly from the inner face of the free end of said blade, said blade having a row of openings formed radially of said pivot, a cutter supporting bar mounted adjacent to the outer surface of said blade and having a cutter member projecting through each of said openings, and means for rotating said shaft.

2. In a vegetable cutter, the combination of a rotatable shaft having a vegetable engaging claw at one end, a support having a vegetable holding pin in line with said shaft and spaced apart from the shaft, a cutting blade fixed to said support with its cutting edge in position to slice a vegetable carried by the shaft when the shaft is rotated in one direction, said cutting blade being formed with a series of slots, a cutter supporting bar having a series of cutters fixed thereto, said cutters being shaped to enter said slots and being formed with shoulders so positioned that when the series of cutters is inserted through the slots and then moved in a direction away from the cutting edge of the first mentioned cutting blade, said shoulders will detachably secure the series of cutting blades in position against movement caused by the pressure of a vegetable being rotated toward the cutting edge of the first mentioned cutter blade.

JOHN E. GUSTIN.